US 11,999,403 B1

(12) United States Patent
Dewey et al.

(10) Patent No.: US 11,999,403 B1
(45) Date of Patent: Jun. 4, 2024

(54) CONSOLE ATTACHMENT

(71) Applicant: MONAHAN PRODUCTS, LLC, Rockland, MA (US)

(72) Inventors: Christina Anne Dewey, Providence, RI (US); Eric Howard Perlman, Weymouth, MA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 0 days.

(21) Appl. No.: 18/562,525

(22) PCT Filed: Aug. 25, 2022

(86) PCT No.: PCT/US2022/041536
§ 371 (c)(1),
(2) Date: Nov. 20, 2023

(87) PCT Pub. No.: WO2023/028239
PCT Pub. Date: Mar. 2, 2023

Related U.S. Application Data

(60) Provisional application No. 63/237,412, filed on Aug. 26, 2021.

(51) Int. Cl.
*B62B 9/26* (2006.01)

(52) U.S. Cl.
CPC ............ *B62B 9/26* (2013.01); *B62B 2203/04* (2013.01)

(58) Field of Classification Search
CPC ............ B62B 9/26; B65D 25/20; B60R 11/02
See application file for complete search history.

(56) References Cited

U.S. PATENT DOCUMENTS

| 4,339,061 | A  | * | 7/1982  | Dunn ................. A61G 5/1094 224/407 |
| 5,417,353 | A  | * | 5/1995  | Stall ...................... A01D 75/008 224/563 |
| 5,645,204 | A  |   | 7/1997  | Struzer |
| 7,461,822 | B2 | * | 12/2008 | Edwards ................ F42B 39/28 248/214 |
| 10,492,366 | B1 | * | 12/2019 | Knudsen .............. A01D 75/008 |
| 10,494,008 | B1 | * | 12/2019 | Scriba ................... B62B 3/1472 |
| 10,661,720 | B2 | * | 5/2020  | Drnek ..................... B65D 25/20 |
| 11,352,042 | B2 | * | 6/2022  | Azad-Tatari ............. B62B 7/06 |
| 2003/0201625 | A1 | * | 10/2003 | Espenshade ........... B62B 9/245 280/642 |
| 2015/0251681 | A1 |   | 9/2015  | Castillo |

FOREIGN PATENT DOCUMENTS

| CN | 101823499 A | 9/2010 |
| GB |    819037 A | 8/1959 |

OTHER PUBLICATIONS

International Search Report and Written Opinion from corresponding International Application No. PCT/US2022/041536 dated Nov. 30, 2022.

* cited by examiner

*Primary Examiner* — Brian D Nash
(74) *Attorney, Agent, or Firm* — Lando & Anastasi, LLP

(57) ABSTRACT

A console attachment that can be mounted on or between the handles of a vehicle, such as an infant stroller, comprises a body, flaps for attaching the body to the stroller's handles, and a means for rotating the body relative to the flaps, so that the body may be attached to the handles in a position that is level with the ground, regardless of the position or angle of the handles. When the body has been rotated to a suitable angle relative to the flaps, it may be secured in place with a fastener.

12 Claims, 5 Drawing Sheets

CONSOLE ATTACHMENT

CROSS-REFERENCE TO RELATED APPLICATIONS

This application is a U.S. National Stage Application under 35 U.S.C. § 371 of International Application No. PCT/US2022/041536, titled "CONSOLE ATTACHMENT." filed on Aug. 25, 2022, which claims priority under 35 U.S.C. § 119(e) to U.S. Provisional Application Ser. No. 63/237,412, titled "CONSOLE ATTACHMENT," filed on Aug. 26, 2021, each of which is incorporated herein by reference in its entirety for all purposes.

FIELD OF TECHNOLOGY

This disclosure relates to a console attachment for a stroller. In particular, this disclosure relates to a removable console that can be mounted on or between the handles of a manually operated vehicle, such as an infant stroller.

SUMMARY

This disclosure is directed to a console attachment that can be mounted between the handles of a push-operated vehicle, such as a stroller. In one embodiment, the console attachment includes a body, a first flap located on a first lateral side of the body, and a second flap located on a second lateral side of the body. The flaps may be releasably and rotatably attached to the body, so that they can be rotated to change the angle of attachment between the body and the flaps. The flaps may also include a self-attachment point located on the flaps, so that the flaps may be wrapped around the handle of a stroller and secured in place by attaching the flap to itself, forming a loop. In some embodiments, the releasable attachment attaching the flaps to the body may be configured to prevent the body from rotating relative to the flap when the releasable attachment is secured. When the resealable attachment is not secured, the flap may be capable of rotating from −45 degrees to 45 degrees relative to the vertical centerline of the body.

The body may also comprise additional features. In some embodiments, the body comprises an interior compartment for storage. In other embodiments, the body may comprise a cup holder. In still other embodiments, the body may also comprise lid.

According to another embodiment, a console attachment is disclosed as comprising a body with a first and second lateral side, a first flap with a first and second end attached to a lateral side of the body at the first end, and a second flap with a first and second end attached to the second lateral side at the first end. In this embodiment, the flaps may include a rotatable attachment means located at the first end of the first and second flaps. The rotatable attachment means may allow the flap to rotate from approximately −45 degrees to 45 degrees relative to the vertical centerline of the body. The flaps may also include a self-attachment point located on the flaps, so that the flaps may be wrapped around the handle of a stroller and secured in place by attaching the flap to itself, forming a loop.

This disclosure is also directed to strollers having a console attachment. According to one embodiment, the stroller comprises handles, and the console attachment may be attached to the handles. The console attachment may include a body, a first flap located on a first lateral side of the body, and a second flap located on a second lateral side of the body. The flaps may be releasably and rotatably attached to the body, so that they can be rotated to change the angle of attachment between the body and the flaps. According to one embodiment, the flaps may be rotated up to 45 degrees in either direction relative to the vertical centerline of the body. The flaps may also include a self-attachment point located on the flaps, so that the flaps may be wrapped around the handle of a stroller and secured in place by attaching the flap to itself, forming a loop. In some embodiments, the releasable attachment attaching the flaps to the body may be configured to prevent the body from rotating relative to the flap when the releasable attachment is secured. When the resealable attachment is not secured, the flap may be capable of rotating from −45 degrees to 45 degrees relative to the vertical centerline of the body. The stroller according to this embodiment may also have handles that may be adjustable for height.

DETAILED DESCRIPTION

Figure 1:
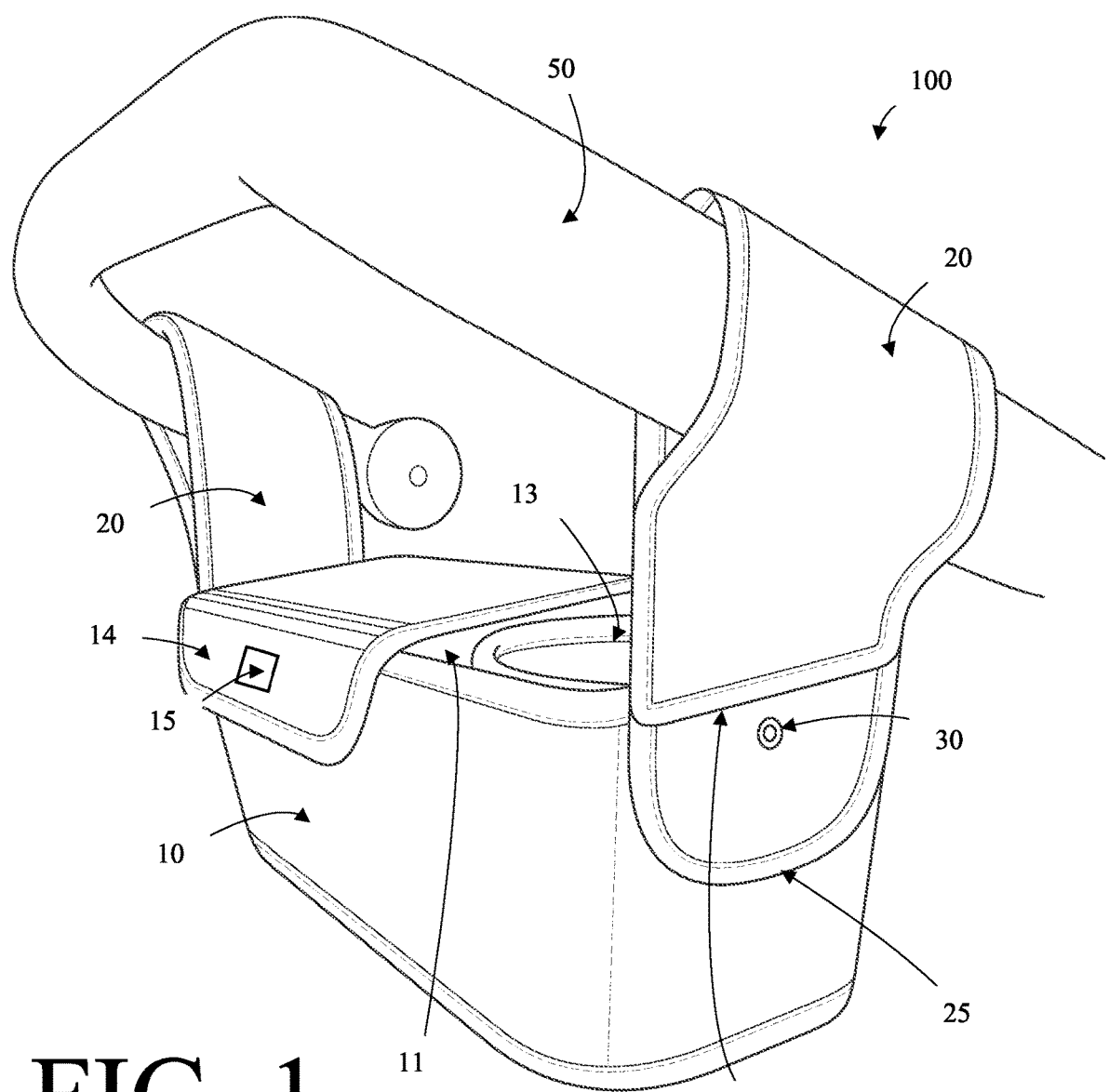
FIG. 1 is a perspective view of a console attachment.

A typical stroller for infants has one or more sets of handles designed to be used by a parent or caregiver to push the stroller. Such handles often include side members on either side of the stroller body that may or may not be connected to one another by a cross member. Stroller designs such as this often create a gap between the stroller body and the handle that can be used to support accessories, such as cup holders, or additional storage.

However, many modern high-end strollers are highly adjustable, including in the position, height, and orientation of the handles. This may be beneficial, for instance, where two caregivers of significantly different heights both wish to experience a similar level of comfort when pushing a stroller. Such adjustments can make it difficult to mount accessories on or between the handles, as a correctly positioned accessory in one handle position may not be properly aligned when the handles are adjusted for another user.

Therefore, a need exists for a console attachment that can be mounted on or between the handles of a stroller and can be easily reconfigured for a variety of handle positions.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including." "comprising." or "having." "containing." "involving." and variations thereof herein, is meant to encompass the items listed thereafter and equivalents thereof as well as additional items.

Referring to FIG. 1, a console attachment 100 may be constructed of a body 10 extending laterally across the open space between the handles 50 of a stroller, having flaps 20 located on either lateral side of body 10. According to one embodiment, flaps 20 are constructed of multiple layers of canvas fabric, connected to one another by stitching around the edge region of flap 20. However, other materials may be used without departing from the spirit of this disclosure, including nylon, polypropylene or polyethylene fabric, or other synthetic or natural fabrics. Each flap 20 may be generally rectangular, and includes a proximal end 25 and a distal end 26. According to some embodiments, the interior face of flap 20 may comprise a non-slip material, such as perforated or textured PVC. The non-slip material is configured to help console attachment 100 remain in a stable position once attached to the handles 50.

Body 10 may be constructed of a variety of materials including canvas, nylon, or other natural or synthetic fabrics. According to one embodiment, body 10 is a soft-shell design constructed entirely of fabric, and capable of being collapsed or folded when not in use. Alternatively, body 10 may be constructed with a hard-shell design, incorporating a rigid frame or liner, so that body 10 may resist crushing, bending or sheer forces in ordinary use. Body 10 may be constructed of any size, but is preferably sized to fit in the open space between the handles of a compatible stroller without interfering with operation of the stroller. According to some embodiments, body 10 may measure approximately 5 to 15 cm in width by 5 to 15 cm in height by 20 to 40 cm in length.

Body 10 may also include compartments. In one embodiment, body 10 comprises a basket 11 for storage. Basket 11 may also other compartments, such as a cup holder 13. Additionally, basket 11 may also comprise features such as a hook or clasp for house keys, a pen holder, a pocket or slot for business cards, coins, receipts, or a wallet, a battery pack for charging portable electronic devices such as a cell phone, a resealable pouch for tissues or wet napkins, or similar features or compartments.

Body 10 may also include a lid 14 designed to cover some or all of basket 11. Lid 14 may be constructed of similar materials to body 10, or different materials. Lid 14 may utilize a soft-shell design, a semi-rigid design, or be constructed of rigid materials. Lid 14 may include a closure 15 capable of securing lid 14 in a closed position across the opening of basket 11. Such a closure may be in the form of a magnetic clasp integrated into the lid, but may also be a snap, buckle, button, hook-and-loop fastener, or similar mechanism.

Figure 2:
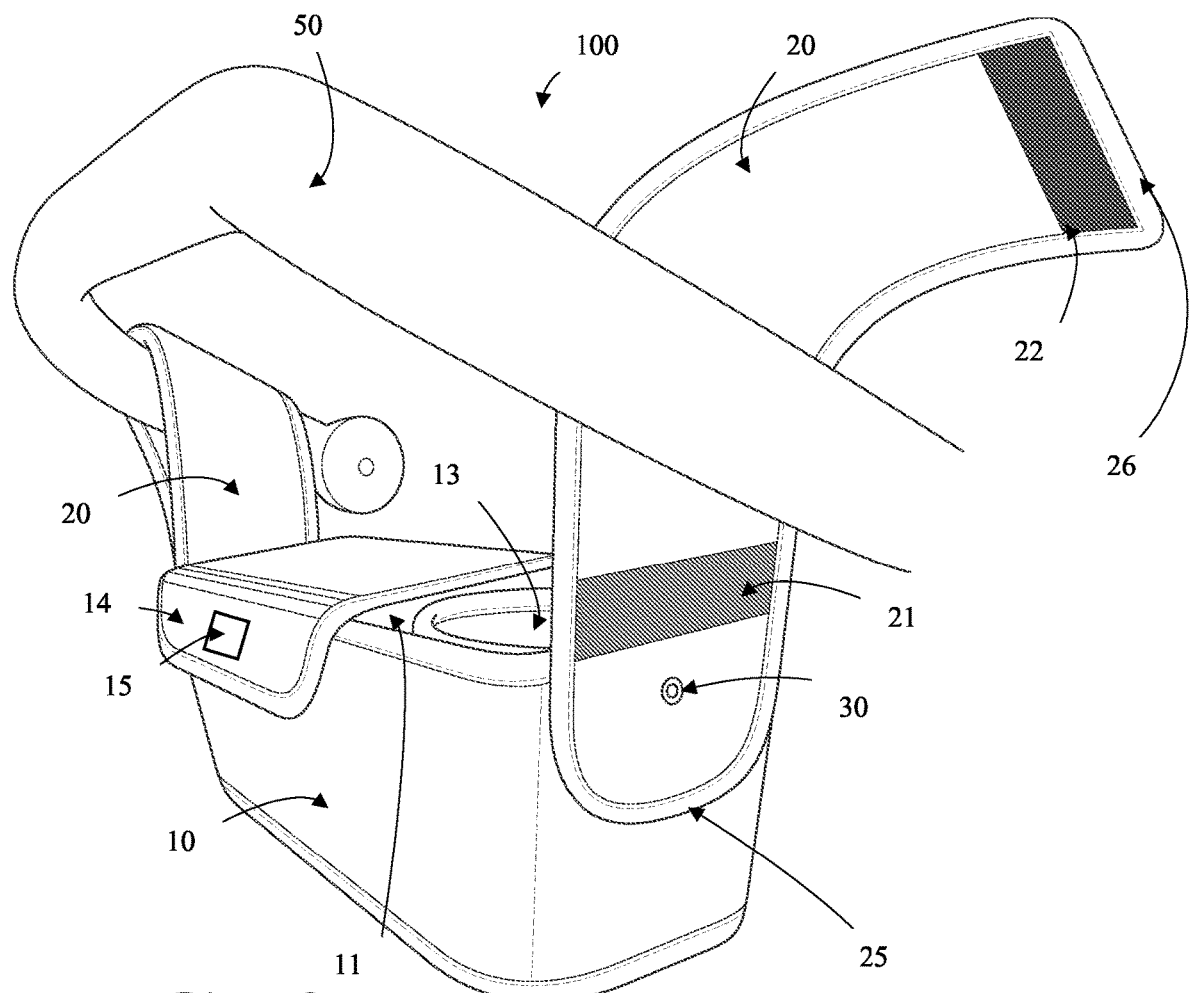
FIG. 2. is a perspective view of a console attachment.

Referring to FIG. 2, flap 20 may include a means of attaching flap 20 to the handles of a stroller. In one embodiment, the means of attaching flap 20 may be hook and loop fasteners, in which the flap comprises a self-attachment point 21 at the proximal end 25, and a corresponding self-attachment point 22 at the distal end 26. Self-attachment point 21 and corresponding self-attachment point 22 may have the same shape as one another, and may be generally rectangular. The surface area of self-attachment point and corresponding self-attachment point may be large enough to support the weight of console attachment 100 under load, and may be configured to support up to 10 lbs. of static weight. In such a configuration, flap 20 may be designed to wrap around a portion of the stroller handle, forming a loop.

Other methods of attaching flaps 20 to the handles of the stroller may also be used. Such methods may include plastic or metal clips configured to releasably attach to the stroller handle, buttons, snaps, or magnets, any of which could be used in addition to or as an alternative to hook and loop fasteners.

Figure 3:
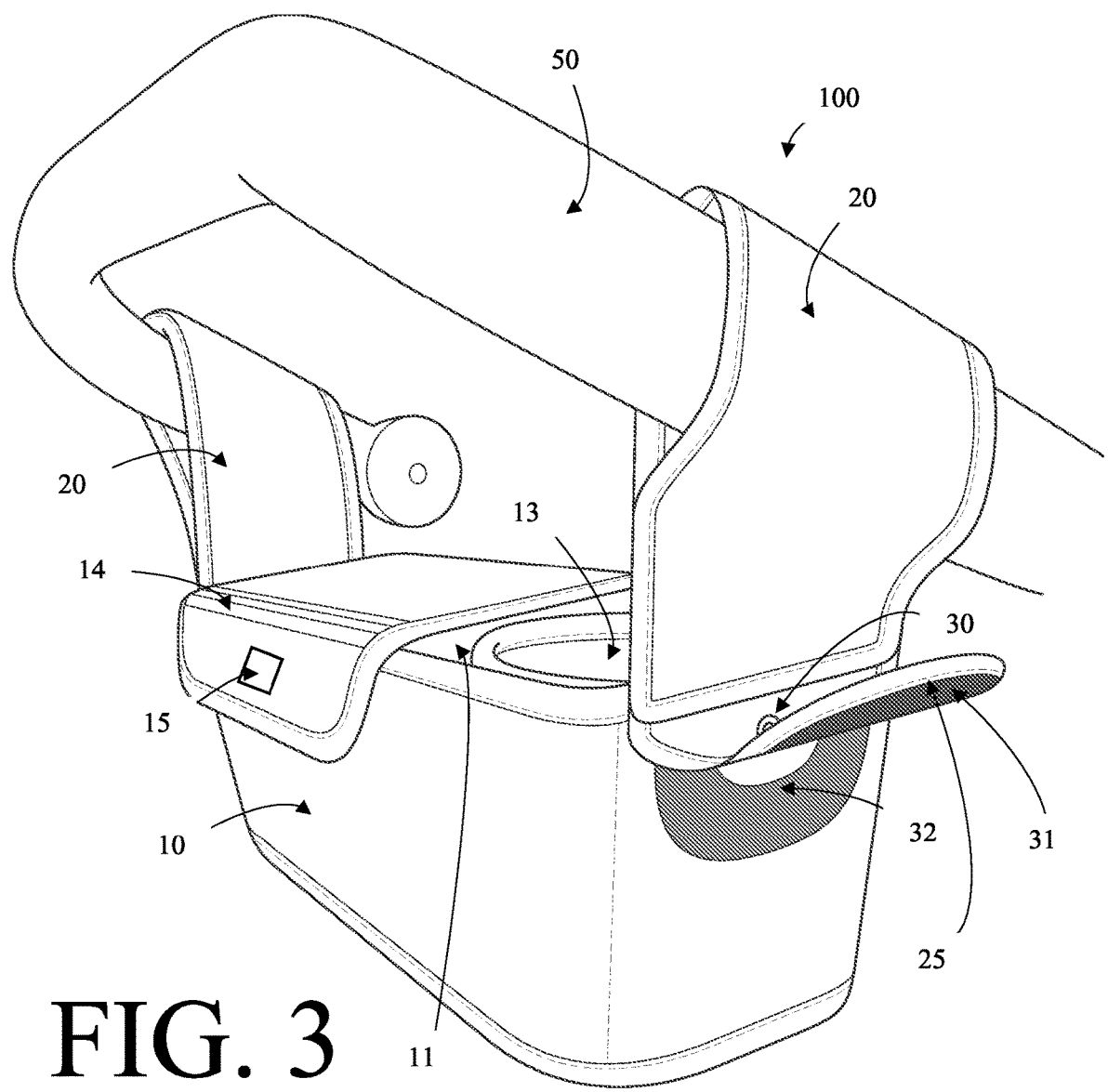
FIG. 3. is a perspective view of a console attachment.

Referring to FIG. 3, flap 20 may also include a means of rotating flap 20 relative to body 10, so that flaps 20 may be attached to the handles at any angle, while body 10 remains upright or level with the ground. In one embodiment, flap 20 may include a grommet 30 at proximal end 25 configured to connect to a socket located on the lateral sides of body 10. Grommet 30 may be configured to form a friction bond with socket sufficient to resist separation during expected use, while allowing body 10 to rotate relative to flaps 20. Other methods of rotating flap 20 relative to body 10 may also be used, including magnetic clasps, nuts-and-bolts, rivets, straps, strings, or cords, without departing from the spirit of this disclosure.

Flap 20 may also include a means of fixing flap 20 at a given angle relative to body 10. In one embodiment, proximal end 25 of flap 20 may include a fastener 31 configured to attach to a corresponding fastener 32 located on the lateral side of body 10. Fastener 31 and corresponding fastener 32 may be hook-and-loop fasteners. According to one embodiment, fastener 31 and corresponding fastener 32 may be semi-circular. The semi-circular configuration allows flap 20 to be rotated through a wide range of angles, while maintaining a large-enough mating surface between fastener 31 and corresponding fastener 32 to support the weight of body 10 under load. Alternatively, fastener 31 and corresponding fastener 32 may be in the form of buttons, snaps, claps, or similar means of securing flap 20 in place relative to body 10.

Figures 4A, 4B:
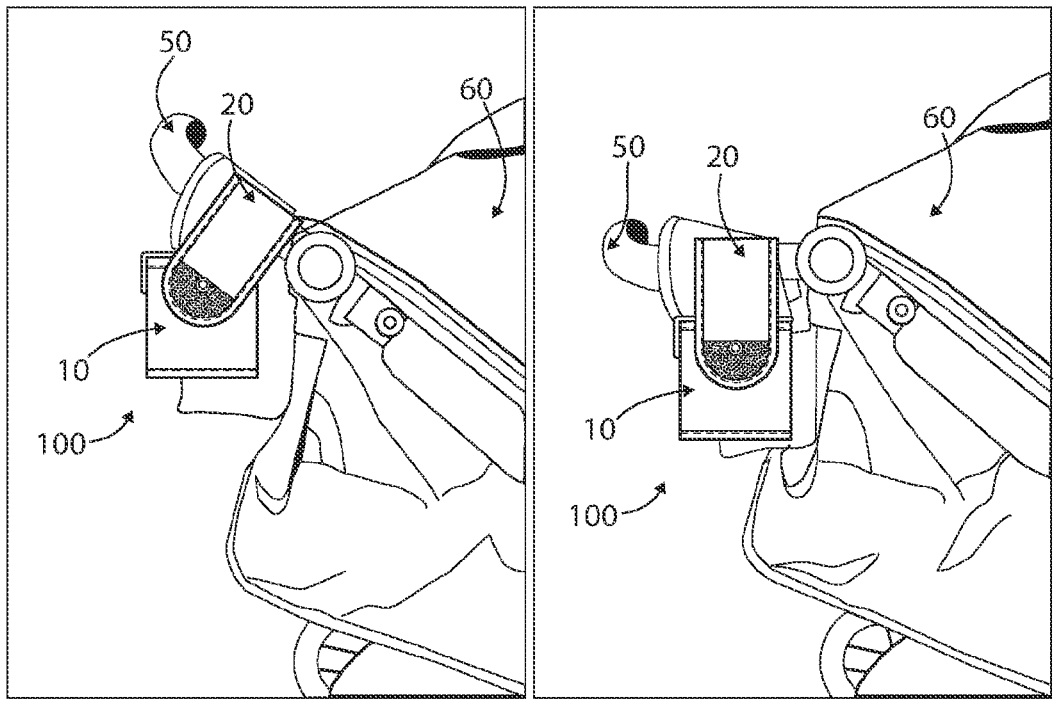
FIG. 4A. is a perspective view of a stroller having a console attachment.
FIG. 4B. is a perspective view of a stroller having a console attachment.

Referring to FIGS. 4A and 4B, a console attachment 100 is shown attached to the handles 50 of stroller 60, in which handles 50 are adjustable. In FIG. 4A, handles 50 have been positioned at a high angle, and console attachment 100 has been rotated so that flaps 20 remain perpendicular to handle 50 and body 10 remains level with the ground. In FIG. 4B, handles 50 have been positioned at a lower angle, and console attachment 100 has likewise been rotated so that flaps 20 remain perpendicular to handle 50 and body 10 remains level with the ground.

Figure 5:
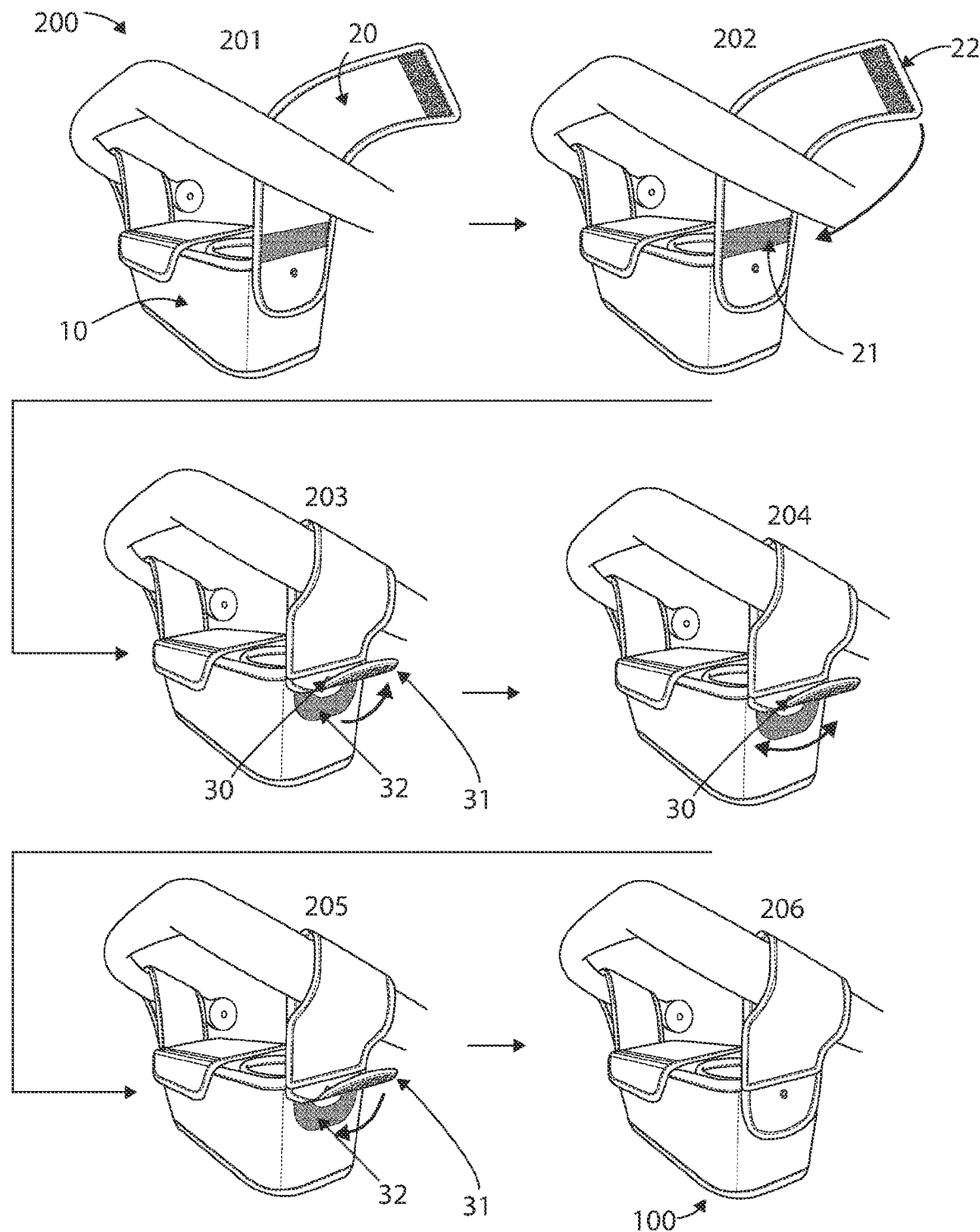
FIG. 5 is a flowchart of the usage.

Referring to FIG. 5, a method 200 for using console attachment 100 according to the present disclosure is provided. In step 201, body 10 is placed between the handles of a stroller, and flaps 20 are folded over the stroller handle. In step 202, self-attachment point 21 is secured to corresponding self-attachment point 22. In step 203, fastener 31 and corresponding fastener 32 are separated from one another on each of the lateral sides of body 10, such that body 10 only remains connected to flap 20 via grommets 30 on each lateral side. In step 204, body 10 is rotated about grommets 30. In step 205, fastener 31 and corresponding fastener 32 are reattached to one another. In step 206, console attachment 100 is ready for use.

Having now described some illustrative embodiments, it is apparent that the foregoing is illustrative and not limiting, having been presented by way of example. In particular, although many of the examples presented herein involve specific combinations of elements, those elements may be combined in other combinations. Elements and features discussed only in connection with one embodiment are not intended to be excluded from other embodiments.

Any references to front and back, left and right, top and bottom, or upper and lower and the like are intended for convenience of description, not to limit the present systems and methods or their components to any one positional or spatial orientation.

Any references to embodiments or elements herein referred to in the singular may also embrace embodiments including a plurality of these elements, and any references in plural to any embodiment or element herein may also embrace embodiments including only a single element. References in the singular or plural form are not intended to limit the presently disclosed components or elements to single or plural configurations.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature or characteristic described in connection with the embodiment may be included in at least one embodiment. Such terms as used herein are not necessarily all referring to the same embodiment. Any embodiment may be combined with any other embodiment, inclusively or exclusively, in any manner consistent with the aspects and embodiments disclosed herein.

What is claimed:

1. A console attachment comprising:
   a body having a first lateral side and a second lateral side;
   a first flap having a first end and a second end;
   wherein the first end of the first flap is attached to the first lateral side of the body by a rotatable attachment and the first end of the first flap is attached to the first lateral side of the body by a releasable attachment, wherein the releasable attachment on the first end of the first flap prevents rotation of the body relative to the first flap;
   wherein the second end of the first flap includes a releasable attachment for engaging with a portion of the first flap; and
   a second flap having first end and a second end;
   wherein the first end of the second flap is attached to the second lateral side of the body by a rotatable attachment and the first end of the second flap is attached to the second lateral side of the body by a releasable attachment;
   wherein the second end of the second flap includes a releasable attachment for engaging with a portion of the second flap.

2. The console attachment of claim 1, wherein the body is approximately 5 to 15 cm in width by 5 to 15 cm in height by 20 to 40 cm in length.

3. The console attachment of claim 1, wherein the rotatable attachment is capable of rotating approximately from −45 degrees to 45 degrees relative to the vertical centerline of the body.

4. The console attachment of claim 1, wherein the first flap forms a loop when the releasable attachment of the second end of the first flap is engaged with a portion of the first flap.

5. The console attachment of claim 4, wherein the second flap forms a loop when the releasable attachment of the second end of the second flap is engaged with a portion of the second flap.

6. A stroller comprising:
   a frame with a handle; and
   the console attachment of claim 1 attached to the handle.

7. The stroller of claim 6, wherein the body is approximately 5 to 15 cm in width by 5 to 15 cm in height by 20 to 40 cm in length.

8. The stroller of claim 6, wherein the rotatable attachment is capable of rotating approximately from −45 degrees to 45 degrees relative to the vertical centerline of the body.

9. The stroller of claim 6, wherein the first flap forms a loop when the releasable attachment of the second end of the first flap is engaged with a portion of the first flap.

10. The stroller of claim 9, wherein the second flap forms a loop when the releasable attachment of the second end of the second flap is engaged with a portion of the second flap.

11. The stroller of claim 6, wherein the first flap forms a loop around the handle.

12. The stroller of claim 11, wherein the second flap forms a loop around the handle.

* * * * *